May 27, 1969     E. FROELICH     3,446,531
BACK SUPPORT
Filed Sept. 14, 1967     Sheet 1 of 2
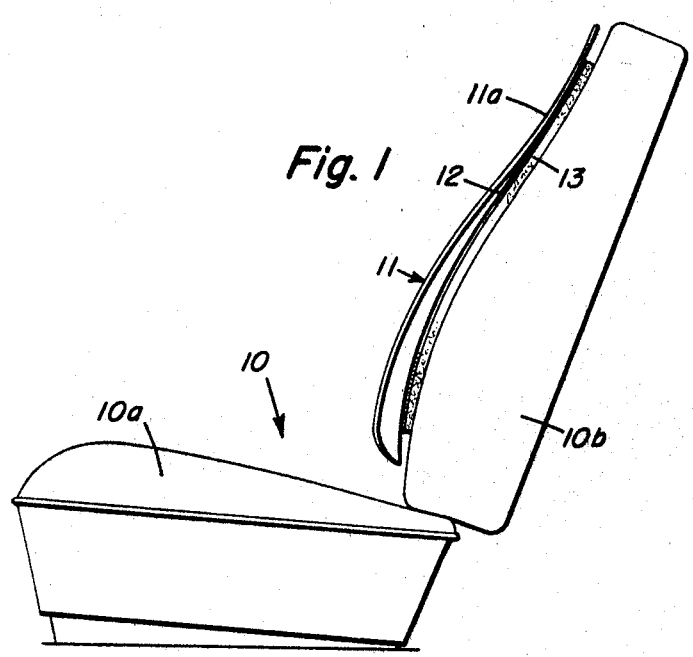
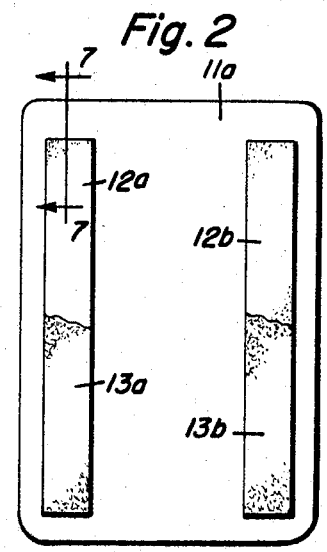
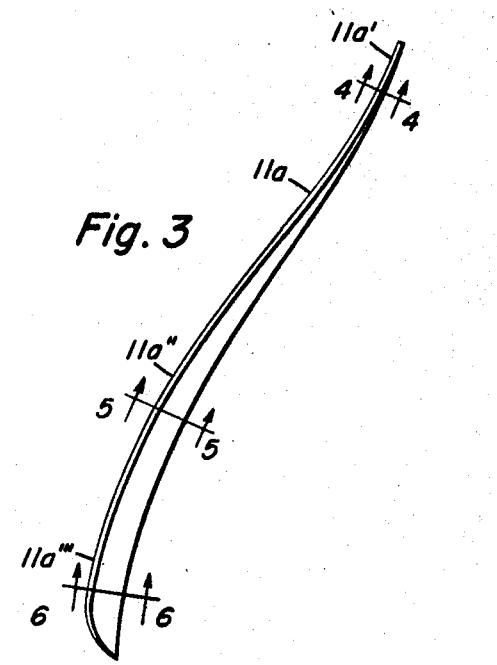
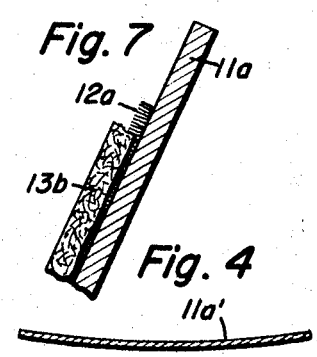
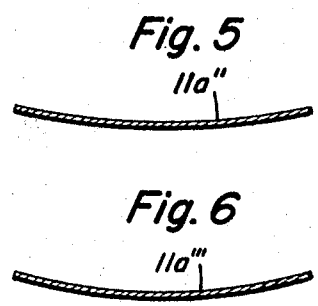
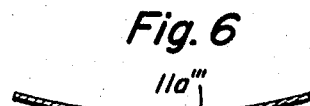
INVENTOR
Edward Froelich
BY John Howard Joynt
ATTORNEY

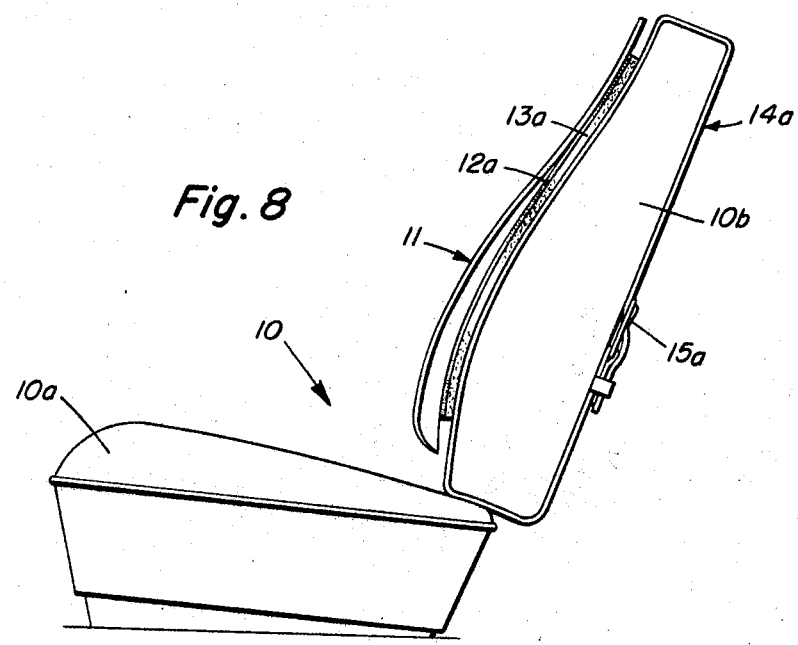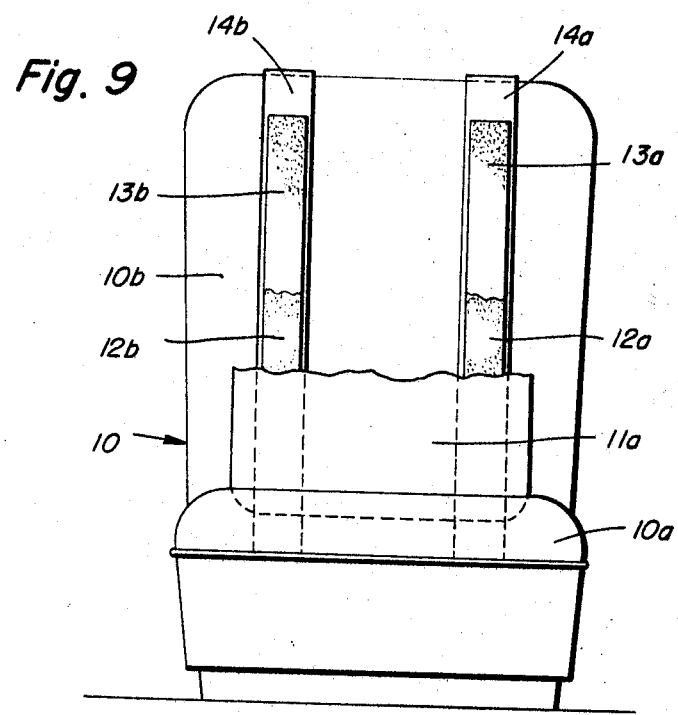

United States Patent Office 3,446,531
Patented May 27, 1969

3,446,531
BACK SUPPORT
Edward Froelich, 5408 Eastview Park,
Chicago, Ill. 60615
Continuation-in-part of application Ser. No. 640,226,
May 22, 1967. This application Sept. 14, 1967, Ser.
No. 674,374
Int. Cl. A47c 25/00, 25/02
U.S. Cl. 297—284                    3 Claims

ABSTRACT OF THE DISCLOSURE

A support for the back of the occupant of a chair, automobile seat, or the like, comprising a rigid contoured orthopedic back support element and fabric hook-and-pile means for securing the orthopedic back support element to the back of the seat.

Cross-references to related applications

This application for patent is a continuation-in-part of my co-pending application Ser. No. 640,226, filed May 22, 1967, entitled Back Support, which latter application generally may be considered a companion of my then co-pending application Ser. No. 558,719, filed June 20, 1966, now Patent No. 3,321,241 of May 23, 1967, entitled, Orthopedic Seat Support and also a companion of my presently co-pending application Ser. No. 640,226, filed May 22, 1967, and entitled, Back Support.

Introduction

The present invention relates to a support for the back of an occupant of a chair, a bench, an automobile seat, or the like Among the objects of my invention is the provision of a back support, that is, a support for the back of an occupant or user of a chair, a bench, an automobile seat, or other seat, for house, office or vehicle use, which is readily suited to attachment and use with such seat; which back support is simple in construction, inexpensive in production, ready in adjustment and well adapted to quick and easy adjustment to the requirements of a particular person; and which support, when adjusted in particular position, will retain that position under the conditions of actual practical use, including the sway, vibration, and the like encountered in vehicle travel.

Other objects of my invention in part will be readily apparent to those skilled in the art to which the invention relates and in part pointed out during the description which follows, particularly when considered along with the accompanying drawings.

Background of the invention

Now in order to gain a better understanding of my invention, it may be noted at this point that it is well recognized that prolonged sitting in a chair, on a bench, in an automobile seat, or the like, frequently is attended by discomfort, particularly in the back of the sitter. And, moreover, that this discomfort is accompanied by rapid tiring, with resulting fatigue. While the region of discomfort varies from person to person, depending upon the physical structure of the person himself and the particular configuration of the seat being used, this discomfort nevertheless is real and significant; the discomfort develops in the thoracic region of some, in the lumber region of others, and in the sacral region of still others. And although efforts have been made over the years to produce chairs and seats of greater comfort, it does not appear that these efforts have resulted in constructions assuring comfort and freedom from fatigue over prolonged periods of use. It appears that while one improved seat is suited to one user and another suited to some other user, none seems to provide universal application, that is, a seat suited to all users. Although there have been made proposals for seats with adjustable backs, these proposals seem to be either too complicated, too uncertain, or prohibitively expensive.

For one reason or another, therefore, the known and available seats have not been found satisfactory in all respects, especially for use over prolonged periods of time by several different users.

Summary of the invention

My invention may be considered as comprising a support for the back of an occupant of a chair, a bench, an automobile seat, or the like, which support employs a rigid and contoured orthopedic back support element, together with fabric hook-and-pile means for adjustably attaching and securing the back support element to the back of the chair, the bench, the automobile seat, or the like, with which it is to be used.

It is an object of the present invention, therefore, to substantially avoid the various defects, disadvantages and shortcomings of the seats of the prior art and at the same time to provide a simple and effective back support at lowest possible cost for ready and easy adaptation to known and available chairs, benches, automobile seats, and the like, which back support is light in weight, pleasing in appearance, and thoroughly reliable in use through ease of adjustment and assurance of maintaining a fixed position once adjusted, all to satisfy the requirements of the particular occupant of the seat.

Brief description of the drawings

In the accompanying drawings wherein I disclose an illustrative embodiment of my invention:

FIG. 1 is a vertical elevation of an automobile seat employing the back support of my invention;

FIG. 2 is a rear elevation of the support with certain parts being broken away to better show others;

FIG. 3 is a side elevation of the orthopedic back support element of the back support of my invention;

FIGS. 4, 5 and 6, respectively, are sectional views along the lines 4—4, 5—5, and 6—6 of FIG. 3 illustrating the curvature of the orthopedic back support element;

FIG. 7 is a detached sectional view along the line 7—7 of FIG. 2 illustrating certain features of the invention;

FIG. 8 is a vertical elevation of an automobile seat employing a modified form of the back support of my invention; and FIG. 9 is a detached front elevation of the support of FIG. 8 with certain parts being broken away to better show others.

Throughout the several views of the drawings, like reference characters denote like structural parts.

Description of the preferred embodiments

Turning now more particularly to the practice of my invention, and in that regard having reference to the several figures of the drawings, a conventional automobile seat is shown at 10 in FIG. 1, this comprising an upholstered seat portion 10a and an upholstered back portion 10b. The back support of my invention geenrally shown at 11 comprises the orthopedic back support element 11a (see also FIG. 3) with fabric interlocking means 12–13 securing the same to the seat back 10b.

The orthopedic back support element 11a (see FIG. 3) is of a rigid and contoured construction. Conveniently, it is fashioned of processed wood fibres, stamped and molded simultaneously by extreme heat and pressure and of sufficient thickness and strength to prevent bending, denting, or other distortion in use. Where desired, however, it is fashioned of molded plastic plywood, hard rubber, aluminum alloy sheet, or the like.

The construction of the orthopedic back support element is such (see FIGS. 4, 5 and 6, along with FIG. 3) that there is provided a contour of slight concavity in the upper portion 11a' of the support element, a contour of greater concavity along toward the lower portion (lumbar) 11a" of the support element, and a contour of greatest concavity near the lowest portion 11a''' of the support element. The lumbar portion of this backrest is a concave curve in a horizontal plane, and a convex curve in a vertical plane. Both curves blend into each other.

The back support element 11a (see FIGS. 2 and 3) for a best combination of results is some 18" to 21" in length, some 9" to 11" in width, with significant overall contour. In the upper region, that is, for support of the dorsal area (see FIG. 4) there is a concavity of about ½". In the lower region, that is, the area of lumbar support, the concavity of the orthopedic back support element is on the order of 1" (see FIG. 5). And in the lowest region, that is, the region affording sacral support of the user, the contour of the support element (see FIG. 6) is on the order of 1½".

Although satisfactory results are had where the orthopedic back support element 11a presents an unprotected surface, best results are had where the element is coverd with suitable fabric, particularly stretch nylon foam. It is found that the fabric to some extent cushions the body pressure of the user and in that regard assures maximum comfort.

The orthopedic back support element, as noted above, is secured to seat back 10b by way of fabric interlocking means 12–13. For easy and reliable adjustment with assurance of fixed retention with adjustment, I employ spaced parallel strips or tapes of hook-and-pile fabric securing the orthopedic back support element 11a to seat back 10b. More particularly (see FIGS. 2 and 7), spaced parallel strips or tapes 12a and 12b of the fabric are adhesively secured to the back face of the orthopedic back support element 11a or, for best results, are sewed to the same, notably to the fabric covering. And cooperating with these spaced parallel strips there are spaced parallel strips or tapes 13a and 13b which are adhesively secured to the face of seat back 10b. For best results, as shown in FIGS. 8 and 9, the parallel strips or tapes of hook-and-pile fabric 13a and 13b are respectively sewed onto straps 14a and 14b, which straps vertically encircle and buckle about the seat back 10b (FIG. 8), as shown at 15a for strap 14a. With the construction noted, any twisting or turning in use of back support 11a, this with respect to seat back 10b, is effectively prevented. So, too, there is prevented undesired up-and-down movement where, as in automobile travel, there is a certain amount of vibration and jog in travel.

Nevertheless, and even with the assured and reliable retention of the back support element with respect to the seat back, easy and ready adjustment to suit a particular user is effectively had. This is achieved by merely pulling the orthopedic back support element in forward direction at its top, or at its bottom as desired, this serving to unhook or release along their lengths the hook-and-pile spaced parallel fabric strips secured to the support element from the spaced parallel strips secured to the seat back. The back support element, then, is either raised or lowered as desired to suit the new user and then pushed in backward direction reuniting the cooperating spaced parallel strips respectively secured to support element and seat back. Upon reuniting the cooperating hook-and-file fabric strips, the rigid contoured orthopedic back support element is firmly held in desired position with respect to the back of the seat with which it is used. And even with the vibration, shock and jogging encountered in vehicle travel, the orthopedic support element is retained without slippage or maladjustment.

While, as noted above, best results are had in the back support of my invention where there are employed spaced parallel strips of hook-and-pile fabric securing the orthopedic back support element to the seat back used, I find that many desirable results, and at low cost, are had where there is employed but a single strip of hook-and-pile fabric secured to the back support element and a cooperating single strip of hook-and-pile fabric secured to the seat back. Or, where desired, there may be employed multiple strips of hook-and-pile fabric secured to the support element with corresponding cooperating multiple strips secured to the seat back. For most practical purposes, however, as noted above, best assurance of desired and retained positioning for a particular user, yet with ready adjustability, is had with the spaced parallel strips of the hook-and-pile fabrics.

Conclusion

It will be seen, therefore, that I provide in my invention a back support for adjustable attachment to the back of a seat, of a chair, or a bench, of an automobile seat, or the like, in which the various objects hereinbefore set forth, together with many practical advantages, are successfully achieved. The orthopedic back support of my invention assures excellent support for the dorsal, the lumbar, and the sacral areas of the back of the user at a bare minimum of cost and with maximum ease of adjustment. Comfortable usage over prolonged periods of time effectively is had.

Inasmuch as many embodiments of my invention may occur to those skilled in the art to which the invention relates, and inasmuch as numerous changes may be made in the embodiments disclosed herein, it is to be understood that all matter described herein is to be taken as illustrative and not by way of limitation.

I claim as my invention:

1. A back support for adjustable attachment to the back of a seat, said support comprising a rigid, contoured orthopedic back support element; one member of hook-and-pile fabric tape secured to said orthopedic back support element; adjustable strap means vertically encircling the back of said seat; and a cooperating member of hook-and-pile fabric tape attached to said strap means for securing to said first-mentioned member and maintaining said orthopedic back support element in desired vertical position respecting the back of the seat.

2. A back support for adjustable attachment to the back of a seat, said support comprising a rigid, contoured orthopedic back support element; fabric cover for the same; one member of fabric hook-and-pile means secured to said fabric cover for said support element; strap means vertically encircling the back of said seat; and a cooperating member of said hook-and-pile means secured to said strap means for removably and adjustably engaging with said first-mentioned member for maintaining said orthopedic back support in desired vertical position respecting the back of said seat.

3. A back support for adjustable attachment to the back of a seat, said support comprising a rigid, contoured orthopedic back support element; fabric cover for the same; first spaced parallel hook-and-pile fabric tapes secured to said orthopedic back support cover; correspondingly spaced strap means vertically encircling the back of said seat; and cooperating corresponding spaced parallel hook-and-pile fabric tapes secured to said strap means for hook-and-pile engagement with said first spaced parallel hook-and-pile fabric tapes for adjustably maintaining said contoured orthopedic back support element in desired vertical position respecting the back of the seat.

References Cited

UNITED STATES PATENTS

| 2,734,556 | 2/1956 | Hebrank | 297—284 XR |
| 2,815,798 | 12/1957 | Lohans | 297—284 XR |
| 2,843,195 | 7/1958 | Barvaeus | 297—284 |
| 2,894,565 | 7/1959 | Conner | 297—284 |
| 3,279,849 | 10/1966 | Radke et al. | 297—284 |
| 3,321,241 | 5/1967 | Froelich | 297—284 |
| 3,331,630 | 7/1967 | Harsh | 297—231 |
| 3,348,880 | 7/1967 | Swann | 297—230 |

CASMIR A. NUNBERG, *Primary Examiner.*

GLENN O. FINCH, *Assistant Examiner.*